Sept. 6, 1949.    G. W. SHAFER    2,481,451
FLORAL ACCESSORY ASSEMBLING MACHINE
Filed Aug. 25, 1947    3 Sheets-Sheet 1
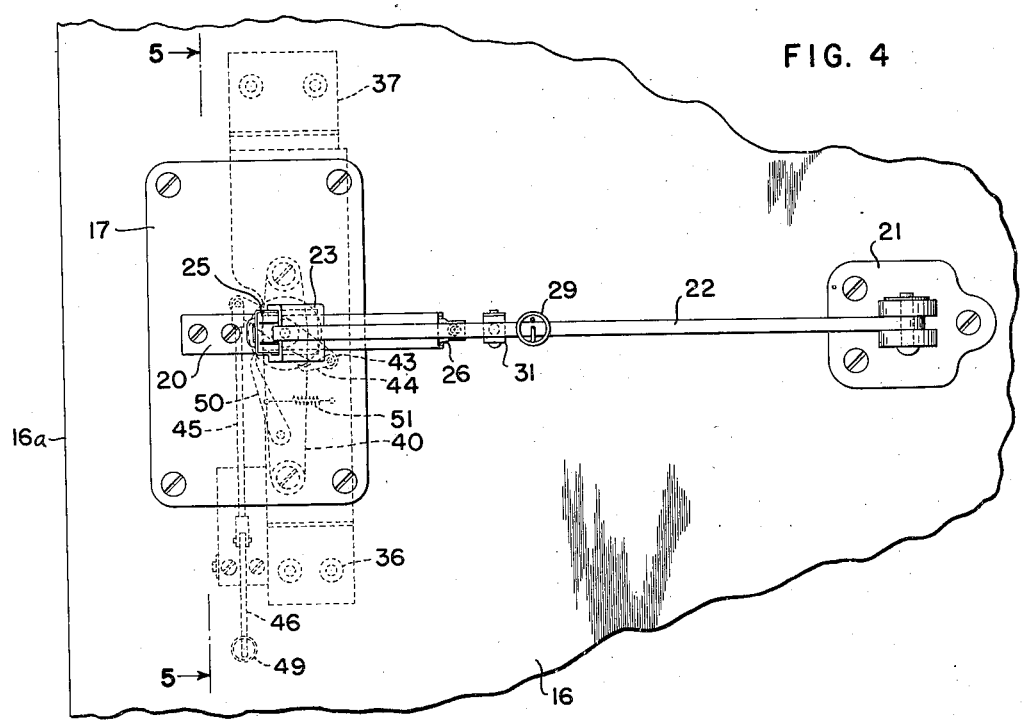
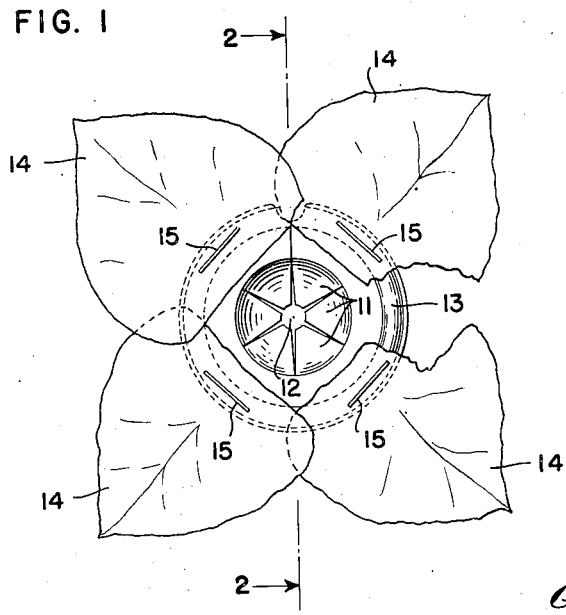
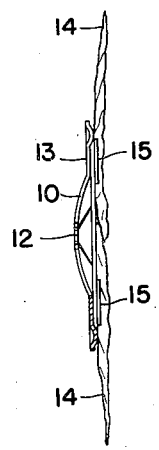
INVENTOR.
George William Shafer
BY
B. T. Wobensmith
ATTORNEY.

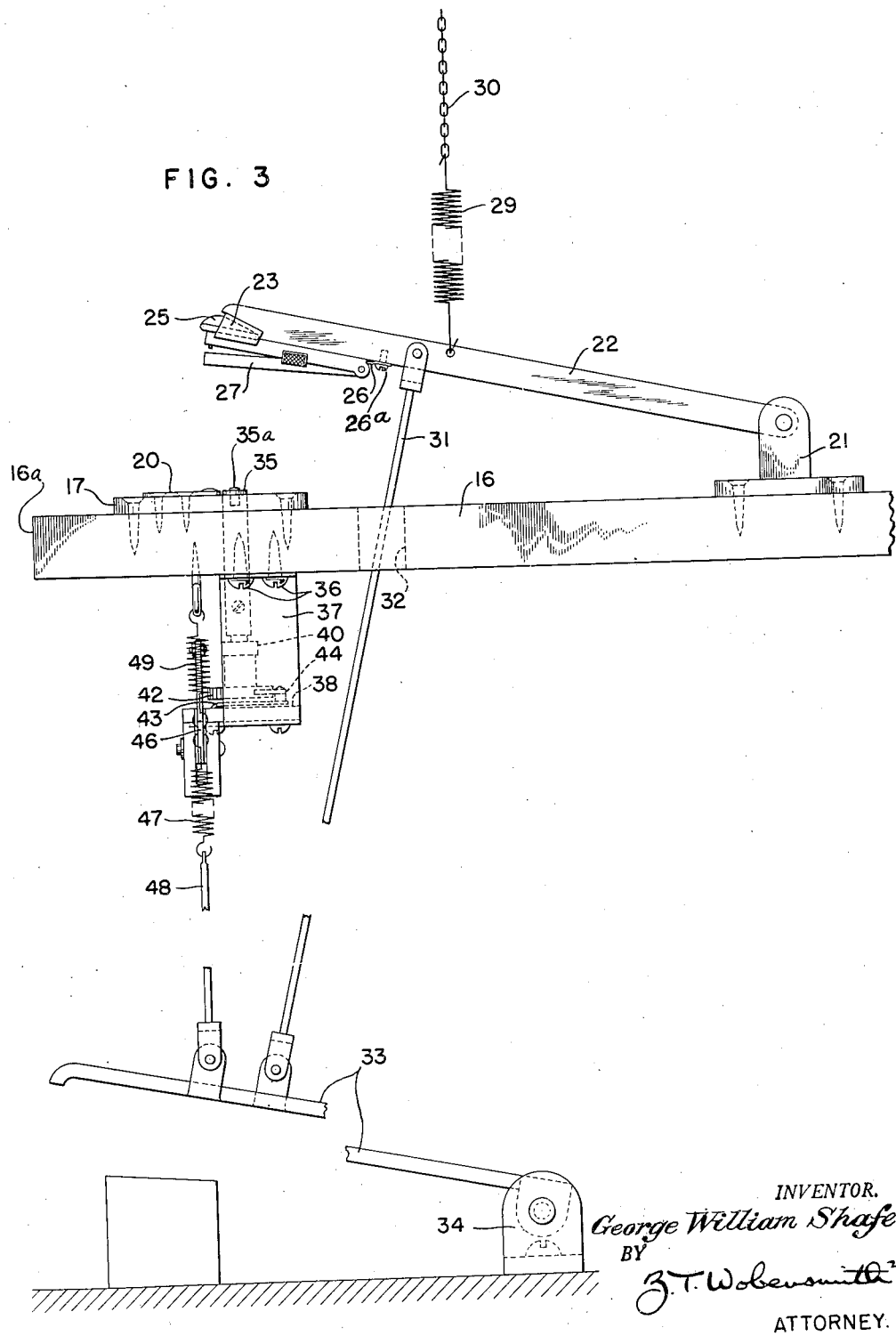

Sept. 6, 1949.     G. W. SHAFER     2,481,451
FLORAL ACCESSORY ASSEMBLING MACHINE
Filed Aug. 25, 1947     3 Sheets-Sheet 3

INVENTOR.
George William Shafer,
BY
ATTORNEY.

Patented Sept. 6, 1949

2,481,451

UNITED STATES PATENT OFFICE 2,481,451

FLORAL ACCESSORY ASSEMBLING MACHINE

George William Shafer, Jamison, Pa., assignor to Ludwig A. Fetzer, Hartsville, Pa.

Application August 25, 1947, Serial No. 770,429

8 Claims. (Cl. 1—3)

This invention relates to machines for making accessories for use in mounting flowers.

It has heretofore been proposed to provide a collar of cardboard, or similar material having a rim portion, and to attach radially disposed leaves to the rim portion, and then to insert a flower through the central opening and secure the flower in position. This character of assembly has been employed particularly in connection with the preparation of gardenias for marketing, although it is also suitable for other flowers. Considerable difficulty has heretofore been encountered in the attachment of the leaves to the collar, and various expedients have been suggested for this purpose.

It has been proposed to employ an adhesive for securing the leaves to the collar, but this has not proven satisfactory in practice. It has also heretofore been proposed to attach the leaves with staples, but the stapling operation has been slow and tedious.

It is the principal object of the present invention to provide a machine for making floral accessories, which is particularly suitable for the attachment of leaves and the like to a collar and the accomplishment of this in a simple and expeditious manner.

It is a further object of the present invention to provide, in a machine of the character aforesaid, sufficient flexibility to permit of the use of various sizes of leaves in accordance with changes in sizes of leaves at different times of the year.

It is a further object of the present invention to provide a machine of the character aforesaid which may be readily operated by unskilled persons, and with which an attractive floral accessory may be readily assembled.

Other objects and advantageous features of the invention will be apparent from the specification and claims.

The nature and characteristic features of the invention will be more readily understood from the following description, taken in connection with the accompanying drawings forming part hereof, in which:

Figure 1 is a front elevational view of a floral accessory prepared with a machine in accordance with the present invention;

Fig. 2 is a vertical sectional view taken approximately on the line 2—2 of Fig. 1;

Fig. 3 is a side elevational view of a preferred form of machine in accordance with the present invention;

Fig. 4 is a top plan view thereof;

Figure 5:
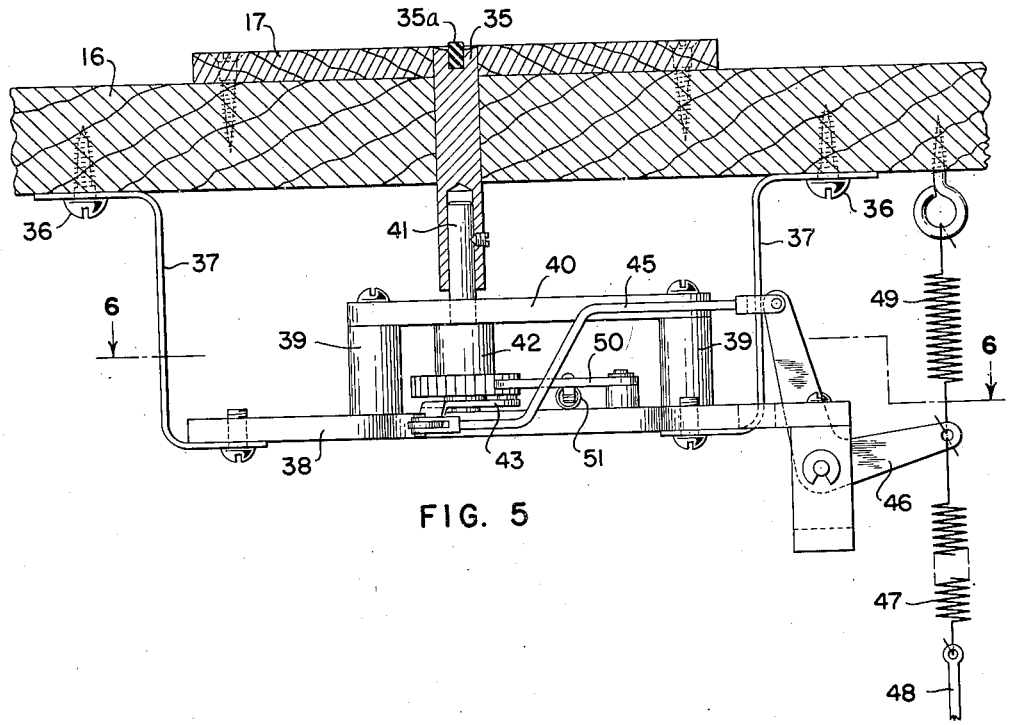
Fig. 5 is a fragmentary vertical sectional view, enlarged, taken approximately on the line 5—5 of Fig. 4, and showing a ratchet mechanism employed in connection with the present invention.

It should, of course, be understood that the description and drawings herein are illustrative merely, and that various modifications and changes may be made in the structure disclosed without departing from the spirit of the invention.

In Figs. 1 and 2 of the drawings, there is illustrated a floral accessory for the making of which the machine of the present invention is particularly suitable. As therein illustrated, a collar 10 of thin sheet material, such as paperboard or the like, is provided, of circular shape with a plurality of inwardly extending slightly dished tongues 11, the ends of the tongues 11 being terminated to provide a central opening 12 and the collar 10 having a rim portion 13 outwardly disposed with respect to the tongues 11. A plurality of leaves 14 having their inner ends cut transversely with respect to the mid rib are shown as mounted thereon, overlapping slightly as desired, to completely cover the collar rim 13, the leaves 14 being held in position by a wire stitching in the form of staples 15, each staple 15 extending through one of the leaves 14 and the rim 13 of the collar 10.

Figure 6:
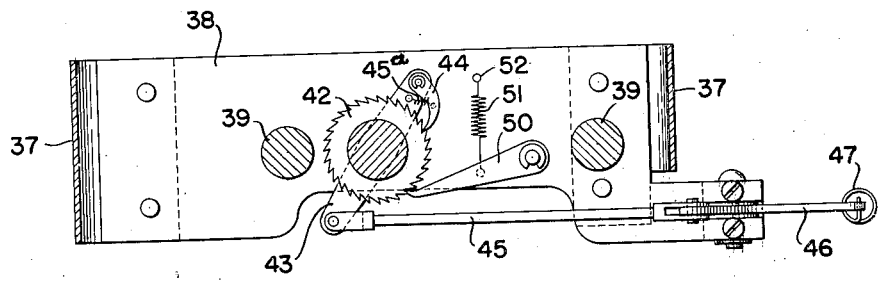
Fig. 6 is a horizontal sectional view of the ratchet mechanism taken approximately on the line 6—6 of Fig. 5.

Referring now more particularly to Figs. 3 to 6, inclusive, of the drawings, a preferred embodiment of the machine in accordance with the invention is therein illustrated.

The machine is shown as mounted upon a table top or other suitable support 16, which support is at the desired elevation to suit the convenience of the operator and has a front edge 16a which is faced by the operator. The table top 16 preferably has a work block 17 mounted thereon on which an anvil 20, preferably of flat strip material, is mounted. To the rear of the work block 17 a standard 21 is provided in which a stitcher lever 22 is pivotally mounted. The stitcher lever 22, at the front end thereof, is provided with a sleeve 23 within which a stitching head 25 of a character now readily available is removably mounted. The stitching head 25 is held in position with respect to the lever 22 by a flat strip 26 mounted on the lever 22 by a screw 26a and in engagement with the rear end of the stitching head 25.

The stitching head 25 has a pivoted arm 27 which is utilized for carrying preformed wire staples, the arm 27 aiding in the release of the staples upon the application of pressure against the lower face of the arm 27 at the free end, and the successive feeding of additional stitches.

The stitcher lever 22 preferably has a retracting tension spring 29 connected thereto, the spring 29 being adapted to be hooked in the desired link of a chain 30 for adjustment. The stitcher lever 22 has pivotally connected thereto an actuating rod 31 which extends through an opening 32 in the table 16 and is connected at its lower end to a pedal lever 33. The pedal lever 33 is pivotally connected at its rear end in a fulcrum block 34.

The work block 17 has a spindle 35 extending vertically therethrough and terminating at its upper end above the upper face of the work block and so as to position the rim 13 of the collar 10 in contact with the anvil plate 20. The upper end of the spindle 35 is dished for the reception of a collar 10 and is provided with a central pin 35a, preferably of rubber or the like, for maintaining a frictional gripping relation with the opening 12 in the collar 10. The spindle 35 extends downwardly through the table 16.

The lower face of the table 16 has mounted thereon, such as by screws 36, spaced frame brackets 37 between which a frame plate 38 is secured. Spaced above the plate 38 and carried on posts 39 a bearing plate 40 is provided.

The spindle 35 at the lower end thereof, has a shaft 41 secured thereto, the shaft 41 being journaled in the plates 38 and 40. The shaft 41 has a ratchet gear 42 connected thereto for rotation therewith.

On the lower portion of the shaft 41, beneath the gear 42, a ratchet lever 43 is provided, having a pawl 44 at one end thereof. A spring 45a is provided for urging the pawl 44 into engagement with the teeth of the ratchet gear 42. The other end of the ratchet lever 43 has an operating rod 45 connected thereto, the rod 45 extending to one arm of a bell crank 46 pivotally mounted on the lower part of the frame plate 38. The bell crank 46 has the other arm thereof connected through a tension spring 47 to an actuating rod 48 which is also pivotally connected at its lower end to the pedal lever 33. A tension spring 49 connected at one end to the table 16 is preferably provided for moving the bell crank 46 counterclockwise (Fig. 5) when the pedal lever 33 is released. The frame plate 38 also has mounted thereon a pawl 50 which is normally held in engagement with the teeth of the ratchet gear 42 by a tension spring 51 connected thereto and to a post 52 on the frame plate 38.

The mode of operation will now be pointed out.

When it is desired to assemble a floral accessory, as illustrated in Figs. 1 and 2, the operator, positioned facing the front edge 16a of the table 16, mounts a collar 10 with the tongues 11 of the collar 10 in engagement with the pin 35a of the spindle 35. The dished upper end of the spindle 35 accommodates the tongues 11 which are of complemental shape. The rim 13 of the collar 10 extends outwardly over the anvil plate 20 and is supported thereby and portions extend over the workblock 17.

The operator then positions a leaf 14 in overlapping relationship with respect to the rim 13 of the collar 10 and above the anvil plate 20 and with the apex of the leaf 14 towards him. With the leaf 14 positioned as desired, the operator then depresses the pedal lever 33.

The downward movement of the pedal lever 33 moves the rod 31 downwardly and this also moves the stitcher lever 22 and the stitching head 23 carried thereby downwardly to a position where a wire staple 15 is inserted through a leaf 14, positioned as indicated, and through the rim 13, and engaged with the bending of the pronged ends into alinement in the usual manner by engagement with the anvil plate 20.

Upon the downward movement of the pedal lever 33, the rod 48 is also moved downwardly against the force of the spring 49 and through the tension spring 47, the bell crank 46 and the rod 45, the ratchet lever 43 is moved counterclockwise (Fig. 6), the pawl 44 slipping past a number of the teeth of the ratchet gear 42. The ratchet gear 42 is held against rotation by the pawl 50 in engagement with the teeth thereof.

Upon the release of the pedal lever 33, the spring 49 tends to return the bell crank 46 to its initial position and through the bell crank 46 and the operating rod 45 is effective for moving the ratchet lever 43 with the pawl 44 thereon in engagement with the teeth for effecting rotation of the gear 42. The rotation of the gear 42 effects movement of the shaft 41 and the spindle 35 through a predetermined angle. This movement of the spindle 35 moves the collar 10 through the same angle and presents a different and adjacent portion of the rim 13 above the anvil plate 20 for the mounting of another leaf 14.

The upward movement of the pedal lever 33 also permits the spring 29 to move the stitcher lever 22 and the stitching head 25 carried thereby upwardly to permit access to the collar 10 carried on the spindle 35 for mounting another leaf or for insertion or removal of the collar 10.

A plurality of leaves 14 are successively positioned on the collar 10 and stitched thereto to cover the rim 13.

The operator, by suitable manipulation and limiting of the upward movement of the pedal lever 33 may vary, as desired, the angle through which the collar 10 is rotated. In this manner the desired number of leaves 14 may be positioned and mounted on the collar 10 and secured by the staples 15.

At some seasons it is desirable to mount four leaves as illustrated in Fig. 1 and at other seasons, when the leaves are smaller, it is sometimes desirable to mount five or even more leaves on the collar 10 to properly cover the rim 13 thereof. By controlling the upward movement of the pedal lever 33 and the turning of the spindle 35 and the collar mounted thereon this may be readily effected as desired.

As soon as the collar 10 has the desired number of leaves mounted thereon, it is removed and another collar 10 mounted with its central opening 12 in engagement with the pin 35a on the spindle 35.

The resilient character of the tongues 11 and the frictional engagement of the ends thereof with the pin 35a prevents slipping of the collar 10 with respect to the spindle 35 during the operation.

It will be noted that in the mounting of the leaves 14 the leaf which is to be stitched is superimposed in position above the anvil plate 20 so that the operator has ready access thereto at all times and may observe the positioning of the leaves 14 as they are secured. The work block 17 supports the leaves which have been stapled.

I claim:

1. In a floral accessory assembling machine, an anvil plate, a movably mounted stapling head, an operating member, operating connections between said operating member and said stapling head for advancing said stapling head towards said anvil for stapling, a vertically disposed rotatable work receiving spindle rearwardly disposed with respect to said anvil plate, and actuating mechanism controlled by the movement of said operating member for rotating said spindle.

2. In a floral accessory assembling machine, an anvil plate, a stitcher lever having a pivotal mounting rearwardly disposed with respect to said anvil plate, a stapling head mounted on said lever and vertically movable towards and away from said anvil plate, a rotatable work receiving spindle rearwardly disposed with respect to said anvil plate, actuating mechanism for said spindle, a pedal lever, and connections between said pedal lever and said stitcher lever and actuating mechanism for moving said stitcher lever to stitching position upon movement of said pedal lever in one direction and for rotating said spindle through a predetermined angle upon movement of said pedal lever in the opposite direction.

3. In a floral accessory assembling machine, a stapling head, mounting means for said stapling head, a rotatable work receiving spindle, actuating mechanism for said spindle, a pedal lever, and connections between said pedal lever and said mounting means and actuating mechanism for actuating said stapling head upon downward movement of said pedal lever and for rotating said spindle through a predetermined angle upon upward movement of said pedal lever.

4. In a floral accessory assembling machine, a stapling head, mounting means for said stapling head including a resilient retracting member, a rotatable work receiving spindle, actuating mechanism for said spindle, a pedal lever, connections between said pedal lever and said stapling head for actuating said stapling head upon downward movement of said pedal lever, and connections between said pedal lever and said actuating mechanism for rotating said spindle through a predetermined angle upon upward movement of said pedal lever.

5. In a floral accessory assembling machine for securing leaves to a collar in radial arrangement, an anvil plate, a stitcher lever having a pivotal mounting to the rear of said anvil plate, a stapling head mounted on the forward end of said lever and movable towards said anvil plate for stapling and away from said anvil plate, a rotatable work receiving spindle having a pin for frictional engagement with said collar, said spindle being disposed between said anvil plate and said pivotal mounting, a pedal lever, and actuating connections interposed between said pedal lever and said stitcher lever and spindle.

6. In a floral accessory assembling machine for securing leaves to a collar in radial arrangement, an anvil plate, a stitcher lever having a pivotal mounting to the rear of said anvil plate, a stapling head mounted on the forward end of said lever and movable towards said anvil plate for stapling and away from said anvil plate, resilient means for retracting said stitcher lever, a rotatable work receiving spindle having a pin for frictional engagement with said collar, said spindle being disposed between said anvil plate and said pivotal mounting, a pedal lever, and actuating connections between said pedal lever and said stitcher lever and spindle actuating the same upon movement of said pedal lever.

7. In a floral accessory assembling machine for securing leaves to a collar in radial arrangement, an anvil plate, a stitcher lever having a pivotal mounting to the rear of said anvil plate, a stapling head mounted on the forward end of said lever and movable towards said anvil plate for stapling and away from said anvil plate, resilient means for retracting said stitcher lever, a rotatable work receiving spindle having a pin for frictional engagement with said collar, said spindle being disposed between said anvil plate and said pivotal mounting, a pedal lever, actuating connections between said pedal lever and said stitcher lever for actuating said stapling head upon downward movement of said pedal lever, and actuating connections including ratchet members between said pedal lever and said spindle for rotating said spindle upon return movement of said pedal lever.

8. In a floral accessory assembling machine, an anvil plate, a movably mounted stapling head, an operating member for actuating said stapling head to and from said anvil plate, a rotatable work-receiving spindle rearwardly disposed with respect to said anvil plate, and actuating mechanism controlled by the movement of the aforesaid operating member for rotating said spindle through a variable angle of desired extent while the stapling head is out of engagement with the anvil plate.

GEORGE WILLIAM SHAFER.

REFERENCES CITED

The following references are of record in the file of this patent:

UNITED STATES PATENTS

| Number | Name | Date |
| --- | --- | --- |
| 605,408 | Durham | June 7, 1898 |
| 1,605,054 | Morgan | Nov. 2, 1926 |
| 2,082,822 | Bruhn | June 8, 1937 |